United States Patent
Li (10) Patent No.: US 11,956,809 B2
(45) Date of Patent: Apr. 9, 2024

(54) RESOURCE DETERMINING METHODS AND APPARATUSES

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 503 days.

(21) Appl. No.: 17/280,177

(22) PCT Filed: Sep. 26, 2018

(86) PCT No.: PCT/CN2018/107729
§ 371 (c)(1),
(2) Date: Mar. 25, 2021

(87) PCT Pub. No.: WO2020/061847
PCT Pub. Date: Apr. 2, 2020

(65) Prior Publication Data
US 2022/0007370 A1 Jan. 6, 2022

(51) Int. Cl.
*H04W 72/53* (2023.01)
*H04W 36/06* (2009.01)
(Continued)

(52) U.S. Cl.
CPC ........... *H04W 72/53* (2023.01); *H04W 36/06* (2013.01); *H04W 72/044* (2013.01); *H04W 72/23* (2023.01)

(58) Field of Classification Search
CPC ... H04W 72/53; H04W 36/06; H04W 72/044; H04W 72/23
See application file for complete search history.

(56) References Cited

U.S. PATENT DOCUMENTS

| 2018/0183551 A1 | 6/2018 | Chou et al. |
| 2018/0270698 A1 | 9/2018 | Babaei |

(Continued)

FOREIGN PATENT DOCUMENTS

| CN | 106161050 A | 11/2016 |
| CN | 107396386 A | 11/2017 |

(Continued)

OTHER PUBLICATIONS

European Patent Office, Extended European Search Report Issued in Application No. 18934759.4, dated Apr. 5, 2022, Germany, (12 pages).

(Continued)

*Primary Examiner* — Deepa Belur
(74) *Attorney, Agent, or Firm* — Arch & Lake LLP (57) ABSTRACT

Provided is a resource determining method. The method includes: determining a first bandwidth part (BWP) from at least one activated and idle BWP according to pre-set configuration information, wherein the first BWP belongs to a serving cell for user equipment; and sending, on the first BWP, first indication information and second indication information to the user equipment, wherein the first indication information indicates a target serving cell in which a time-frequency resource for the user equipment processing (Continued)

---

Detect whether the activated BWP of the second serving cell and the inactive BWP of the second serving cell are idle or not — S13

Determine a first BWP from at least one activated and idle BWP according to pre-set configuration information, wherein the first BWP belongs to a first serving cell for user equipment — S11

Send first indication information and second indication information to the user equipment on the first BWP, wherein the first indication information indicates a target serving cell in which a time-frequency resource for the user equipment processing data is located, and the second indication information indicates a target BWP in which the time-frequency resource for the user equipment processing data is located. Processing data may include receiving data and/or sending data — S12 data is located, and the second indication information indicates a target BWP in which the time-frequency resource for the user equipment processing data is located.

20 Claims, 8 Drawing Sheets

(51) Int. Cl.
  *H04W 72/044* (2023.01)
  *H04W 72/23* (2023.01)

(56) References Cited

U.S. PATENT DOCUMENTS

| | | | | |
|---|---|---|---|---|
| 2020/0280894 | A1* | 9/2020 | Koskinen | H04W 24/08 |
| 2020/0313832 | A1* | 10/2020 | Kim | H04L 5/0098 |
| 2020/0337069 | A1* | 10/2020 | Jiang | H04W 16/14 |
| 2021/0274487 | A1* | 9/2021 | Matsumura | H04B 7/088 |
| 2022/0174734 | A1* | 6/2022 | Li | H04L 5/0073 |

FOREIGN PATENT DOCUMENTS

| | | | |
|---|---|---|---|
| CN | 108260214 A | 7/2018 | |
| CN | 108370573 A | 8/2018 | |
| CN | 108401525 A | 8/2018 | |
| CN | 108496317 A | 9/2018 | |
| WO | 2016119281 A1 | 8/2016 | |
| WO | 2017080248 A1 | 5/2017 | |
| WO | 2018121621 A1 | 7/2018 | |
| WO | WO-2019076170 A1 * | 4/2019 | H04W 72/00 |

OTHER PUBLICATIONS

Intellectual property India, Office Action Issued in Application No. 202147013138, dated Feb. 3, 2022, (2 pages). (Submitted with Partial Machine Translation).

ISA State Intellectual Property Office of the People's Republic of China, Written Opinion of the International Searching Authority Issued in Application No. PCT/CN2018/107729, dated Jun. 24, 2019, WIPO, (8 pages).

State Intellectual Property Office of the People's Republic of China, Office Action and Search Report Issued in Application No. 201880002581.9, dated Apr. 6, 2021, (14 pages) (Submitted with Machine Translation).

Vivo, "Discussion on the channel access procedures", 3GPP TSG RAN WG1 Meeting#93, R1-1806086, Busan, Korea, May 21-25, 2018, (5 pages).

International Search Report issued in PCT Application No. PCT/CN2018/107729, dated Jun. 24, 2019 with English translation, (4p).

Office Action and Search Report Issued in Chinese Application No. 201880002581.9 dated Aug. 4, 2020 with English translation, (16p).

State Intellectual Property Office of the People's Republic of China, Office Action and Search Report Issued in Application No. 2021112648833, dated Jun. 26, 2023, 10 pages. (Submitted with Machine Translation).

Vivo, "Discussion on the channel access procedures", 3GPP TSG RAN WG1 Meeting #94, R1-1808237, Gothenburg, Sweden, Aug. 20-24, 2018, 6 pages.

Qualcomm Incorporated,"Remaining control plane issues of BWP", 3GPP TSG-RAN WG2 Meeting #100, R2-1713885, Reno, USA, Nov. 27-Dec. 1, 2017, 7 pages.

\* cited by examiner

RESOURCE DETERMINING METHODS AND APPARATUSES

CROSS-REFERENCE TO RELATED APPLICATION

This application is the national phase of International Application No. PCT/CN2018/107729, filed on Sep. 26, 2018, the disclosure of which is incorporated herein by reference in its entirety for all purposes.

TECHNICAL FIELD

The present disclosure relates to the technical field of communications, and in particular, to resource determining methods, resource determining apparatuses, electronic devices, and computer-readable storage media.

BACKGROUND

In the 5G NR technology, the concept of BWP (bandwidth part) is proposed, and a carrier for a serving cell is divided into a plurality of segments of bandwidth and each segment of the bandwidth is a bandwidth part.

For each user equipment, each serving cell may be configured with a plurality of bandwidth parts, but with only one activated bandwidth part at the same time, and the user equipment only needs to monitor a downlink signal or send an uplink signal on the activated bandwidth part. Furthermore, for different user equipment, even if the serving cell is the same, the activated bandwidth part may be different, and the bandwidth of each configured bandwidth part may also be different. The base station may configure a handover of the activated BWP for the user equipment according to the service requirements. If the bandwidth of the activated BWP is too small to provide the user equipment with the required transmission rate, the base station may configure a new activated BWP for the user equipment, and the user equipment performs a handover from an old activated BWP to a new activated BWP.

In addition, if the serving cell of the user equipment is located on an unlicensed spectrum, and the base station detects that the channel for the activated BWP of the user equipment is non-idle, the service of the user equipment cannot be processed through the activated BWP. Furthermore, since the channel for activating the BWP is non-idle, the base station cannot send the BWP handover signaling to the user equipment through the activated BWP. Consequently, there is a large delay in the service processing.

SUMMARY

In view of this, embodiments of the present disclosure provide resource determining methods, resource determining apparatuses, electronic devices, and computer-readable storage media.

According to a first aspect of the present disclosure, a resource determining method is provided, including:
  determining a first bandwidth part (BWP) from at least one activated and idle BWP according to pre-set configuration information, wherein the first BWP belongs to a first serving cell for user equipment;
  sending, on the first BWP, first indication information and second indication information to the user equipment, wherein the first indication information indicates a target serving cell in which a time-frequency resource for the user equipment processing data is located, and the second indication information indicates a target BWP in which the time-frequency resource for the user equipment processing data is located.

According to a second aspect of the present disclosure, a resource determining method is provided, including:
  receiving, on a first activated and idle BWP of a first serving cell, first indication information and second indication information from a base station;
  determining, according to the first indication information, a target serving cell in which a time-frequency resource for processing data is located, and determining, according to the second indication information, a target BWP in which the time-frequency resource for a user equipment processing data is located;
  processing data with the time-frequency resource in the target BWP of the target serving cell.

According to a third aspect of the present disclosure, a resource determining apparatus is provided, including:
  a bandwidth part determining module configured to determine a first bandwidth part (BWP) from at least one activated and idle BWP according to pre-set configuration information, wherein the first BWP belongs to a first serving cell for user equipment;
  an indication information sending module, configured to send first indication information and second indication information on the first BWP to the user equipment, wherein the first indication information indicates a target serving cell in which a time-frequency resource for the user equipment processing data is located, and the second indication information indicates a target BWP in which the time-frequency resource for the user equipment processing data is located.

According to a fourth aspect of the present disclosure, a resource determining apparatus is provided, including:
  an indication information receiving module configured to receive, on a first activated and idle BWP of a first serving cell, first indication information and second indication information from a base station;
  a resource determining module configured to determine, according to the first indication information, a target serving cell in which a time-frequency resource for processing data is located, and determine, according to the second indication information, a target BWP in which the time-frequency resource for a user equipment processing data is located;
  a data processing module configured to process data with the time-frequency resource in the target BWP of the target serving cell.

According to a fifth aspect of the present disclosure, an electronic device is provided, including:
  a processor;
  a memory for storing processor-executable instructions;
  wherein the processor is configured to implement the steps in the resource determining method according to any of the above embodiments.

According to the sixth aspect of the embodiments of the present disclosure, a computer-readable storage medium having a computer program stored thereon is provided, and the program is executed by a processor to implement the steps in the resource determining method according to any one of the above embodiments.

BRIEF DESCRIPTION OF DRAWINGS

To describe the technical solutions in the embodiments of the present application more clearly, the accompanying drawings required for describing the embodiments are briefly introduced below. Obviously, the accompanying drawings in the following description are merely some embodiments of the present application, and for a person of ordinary skill in the art, other drawings can be obtained according to the accompanying drawings without creative efforts.

DETAILED DESCRIPTION OF THE EMBODIMENTS

The technical solutions in the embodiments of the present application will be clearly and completely described below with reference to the accompanying drawings in the embodiments of the present application. Obviously, the described embodiments are merely a part of the embodiments of the present application, rather than all of the embodiments. Based on the embodiments of the present application, all other embodiments obtained by a person of ordinary skill in the art without creative efforts all belong to the scope of protection of the present application.

Figure 1:
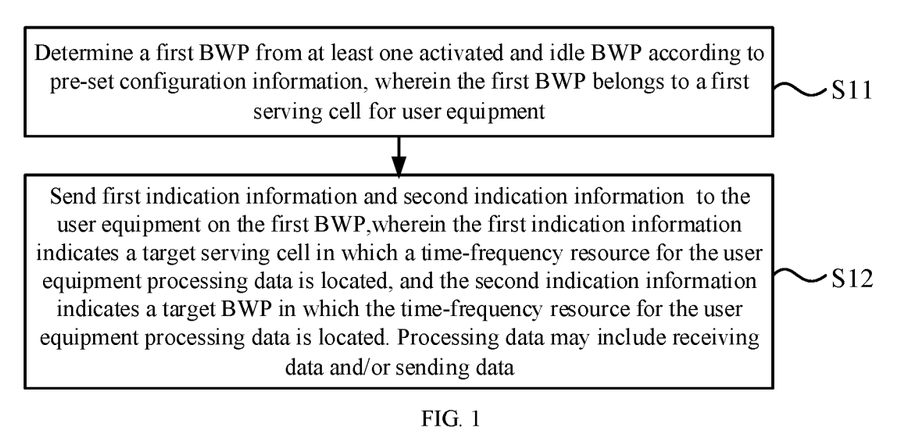
FIG. 1 is a schematic flowchart of a resource determining method according to an embodiment of the present disclosure.

FIG. 1 is a schematic flowchart of a resource determining method according to an embodiment of the present disclosure. The resource determining method shown in the embodiment may be applicable to a base station, such as a 5G base station. The base station may communicate with user equipment, and the user equipment may be an electronic device such as a mobile phone, a tablet computer and a wearable device.

As shown in FIG. 1, the resource determining method may include the following steps.

In step S11, a first BWP is determined from at least one activated and idle BWP according to pre-set configuration information, wherein the first BWP belongs to a first serving cell for user equipment.

In step S12, first indication information and second indication information are sent on the first BWP to the user equipment, wherein the first indication information indicates a target serving cell in which a time-frequency resource for the user equipment processing data is located, and the second indication information indicates a target BWP in which the time-frequency resource for the user equipment processing data is located. Processing data may include receiving data and/or sending data.

In an embodiment, the user equipment may have a plurality of serving cells, each serving cell corresponds to each carrier respectively, and each carrier may be divided into a plurality of BWPs. The base station configures one or more BWPs on the carrier of the serving cell for the user equipment while configuring each serving cell for the user equipment, and only one activated BWP exists in the BWPs of the same serving cell, and the user equipment performs uplink signal transmission and downlink signal reception only on the activated BWP.

The carrier may belong to a licensed spectrum and/or an unlicensed spectrum. In the case where the carrier belongs to both the licensed spectrum and the unlicensed spectrum, the definition of the idle BWP is different.

In the case where the carrier belongs to the unlicensed spectrum, whether the BWP configured by the base station for the user equipment is idle may be determined in such a way that, the base station may monitor, on the channel of the BWP, the RSSI (Received Signal Strength Indication) of signals sent by other devices around the base station; if the RSSI is greater than a pre-set threshold, it may be determined that the other devices are occupying the channel on the BWP, i.e., the BWP is not idle; if the RSSI is less than or equal to a pre-set threshold, it may be determined that the BWP is idle.

In the case where the carrier belongs to the licensed spectrum, the BWP on the carrier is idle.

Because the base station needs to send information to the user equipment through the activated and idle BWP, at least one activated and idle BWP may be determined first. If one activated and idle BWP is determined, the activated and idle BWP is taken as the first BWP. If activated and idle BWPs are determined, one BWP may be determined from the activated and idle BWPs as the first BWP according to pre-set configuration information. The manner of determining the first BWP according to the pre-set configuration information may be selected based on demand, which is not limited. For example, a serving cell corresponding to the activated and idle BWPs may be determined, and then the activated and idle BWP corresponding to the serving cell with the highest priority is taken as the first BWP. or a BWP with a minimum number among the activated and idle BWPs is taken as the first BWP.

In an embodiment, a base station may send first indication information to user equipment to indicate a target serving cell in which a time-frequency resource for the user equipment processing data is located. The second indication information may also be sent to the user equipment to indicate a target BWP in which the time-frequency resource with which the user equipment processes data is located. Thus, when the activated BWP in a certain serving cell (for example, the target serving cell) for the user equipment is not idle, the base station sends the first indication information and the second indication information to the user equipment through the activated and idle BWP of the first serving cell, such that the user equipment may hand over the activated BWP in the target serving cell (for example, handover to the target BWP indicated by the second indication information), and therefore an idle BWP may be configured as an activated BWP and the user equipment is instructed to be handed over to the idle BWP. As a result, the user equipment may process the data in time on the time-frequency resource of the target BWP, thereby the utilization ratio of the carrier of the target serving cell is improved, and the delay of service processing is reduced.

Optionally, the first indication information indicates the first serving cell, and the second indication information indicates the first BWP.

In an embodiment, the base station may send the first indication information and the second indication information to the user equipment through the first BWP of the first serving cell. In this case, the first BWP is an activated and idle BWP of the first serving cell. Then, the user equipment does not hand over the activated BWP of the first serving cell. However, the first indication information and the second indication information still carry contents. Therefore, the user equipment may be instructed to use the time-frequency resources in the first BWP of the first serving cell.

Optionally, the first indication information indicates the first serving cell, the second indication information indicates a second BWP other than the first BWP, and the second BWP is an inactive but idle BWP of the first serving cell.

In an embodiment, the base station may send the first indication information and the second indication information to the user equipment through the first BWP of the first serving cell, in this case, the first BWP is an activated and idle BWP of the first serving cell. In general, it is not necessary for the user equipment to hand over the activated BWP of the first serving cell, but in some cases the user equipment still needs to hand over the BWP.

For example, the bandwidth of the first BWP cannot satisfy the bandwidth required for the user equipment to process data on the first serving cell, or there is a plurality of user equipments using BWP, in these cases, if the user equipment still uses the time-frequency resources in the first BWP to process data, the speed of processing data by the user equipment may be slow. Therefore, the data may be processed by sending the second indication information to the user equipment to instruct the user equipment to hand over the activated BWP (namely, the first BWP) to the second BWP of the first serving cell, to ensure the speed of data processing.

Optionally, the first indication information indicates a second serving cell other than the first serving cell, and the second indication information indicates a third BWP which is an activated and idle BWP of the second serving cell.

In an embodiment, the first indication information from the base station to the user equipment may also be indicated across cells (cross carriers). That is, the first indication information is sent to the user equipment on the first serving cell. However, the user equipment is instructed to perform data processing on the time-frequency resources of the BWP of the second serving cell. For example, the activated and idle BWP of the second serving cell is a third BWP. Then, the user equipment does not need to hand over the activated BWP of the second serving cell. However, the second indication information still needs to carry the content, and therefore the user equipment may still instruct the user equipment to use the time-frequency resources in the third BWP of the second serving cell.

Optionally, the first indication information indicates a second serving cell other than the first serving cell, and the second indication information indicates a fourth BWP which is an inactive but idle BWP of the second serving cell.

In an embodiment, the first indication information from the base station to the user equipment may also be indicated across cells (cross carriers), and the second indication information may be indicated across BWPs, that is, the first indication information and the second indication information are sent on the first BWP to the user equipment of the first serving cell, and the user equipment is instructed to hand over the activated BWP to the fourth BWP of the second serving cell.

Figure 2:
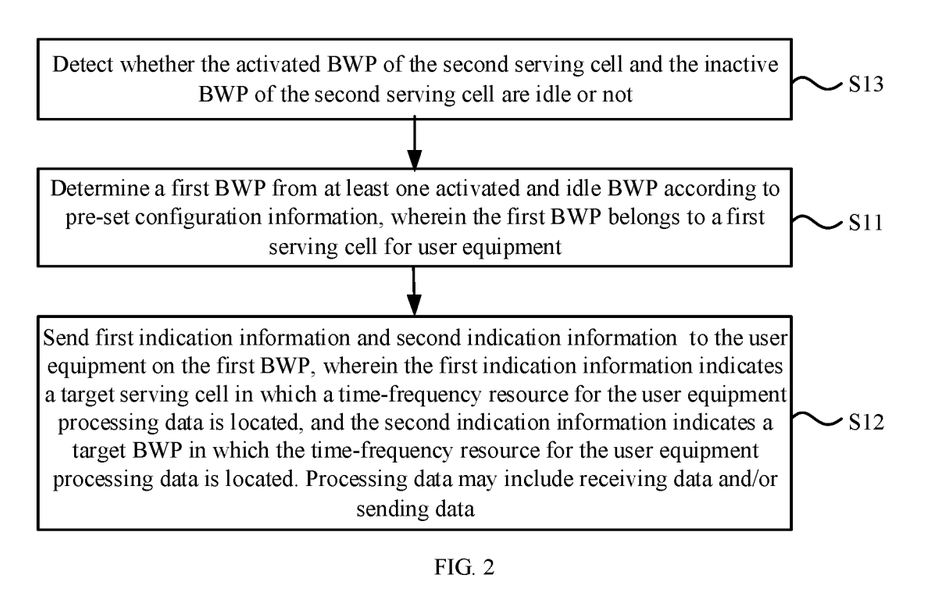
FIG. 2 is a schematic flowchart of another resource determining method according to an embodiment of the present disclosure.

The base station instructs the user equipment to hand over the activated BWP to the fourth BWP of the second serving cell may include two situations, one of which is that the activated BWP of the second serving cell is still idle, but the bandwidth of the second serving cell cannot satisfy the bandwidth required for the user equipment to process data in the second serving cell, and the other of which is the embodiment shown in FIG. 2.

FIG. 2 is a schematic flowchart of another resource determining method according to an embodiment of the present disclosure. As shown in FIG. 2, the method further includes the following steps.

In step S13, before the first BWP sends the first indication information and the second indication information to the user equipment, it is detected whether the activated BWP of the second serving cell and the inactive BWP of the second serving cell are idle or not.

If the activated BWP of the second serving cell is not idle but the inactive BWP of the second serving cell is idle, the first indication information and the second indication information are sent on the first BWP to the user equipment.

It is noted that, step S13 may be executed prior to step S11 as shown in FIG. 2, or the order of the execution may be adjusted according to demand, and it only needs to ensure the execution prior to step S12.

In an embodiment, before the first BWP sends the first indication information and the second indication information to the user equipment, it may be first detected whether the activated BWP and the inactive BWP configured for the user equipment in the second serving cell are idle or not. If the activated BWP of the second serving cell is not idle, it may be determined that the user equipment, in the second serving cell, cannot receive or send data through the activated BWP, and an idle BWP exists in the inactive BWP configured for the user equipment in the second serving cell. Then, the first indication information and the second indication information may be sent to the user equipment. so that the user equipment hands over the activated BWP to the idle fourth BWP of the second serving cell. It is ensured that the user equipment may smoothly process data in the second serving cell through the fourth BWP.

It is noted that the carrier for the second serving cell may be an unlicensed carrier.

Optionally, the carrier for the first serving cell is a licensed carrier.

Optionally, the carrier for the first serving cell is an unlicensed carrier.

Figure 3:
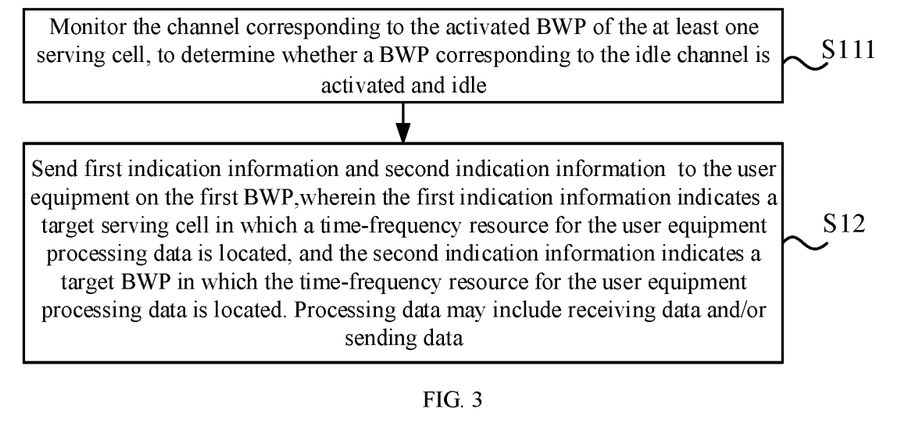
FIG. 3 is a schematic flowchart of yet another resource determining method according to an embodiment of the present disclosure.

FIG. 3 is a schematic flowchart of yet another resource determining method according to an embodiment of the present disclosure. As shown in FIG. 3, the determining the first BWP from at least one activated and idle BWP according to the pre-set configuration information includes the following step.

In step S111, the channel corresponding to the activated BWP of the at least one serving cell is monitored, to determine whether the BWP corresponding to the idle channel is activated and idle.

In an embodiment, in the case where the carrier belongs to the unlicensed spectrum, whether the BWP configured by the base station for the user equipment is idle or not may be determined in a such way that, the base station monitors the RSSI of signals sent by other devices around the base station on the channel of the BWP. If the RSSI is greater than the pre-set threshold, it may be determined that the other devices are occupying the channel on the BWP, i.e., the BWP is not idle; if the RSSI is less than or equal to the pre-set threshold, it may be determined that the BWP is idle, and then the BWP belongs to an activated and idle BWP.

Optionally, the first indication information and the second indication information are comprised in downlink control information (DCI, Downlink Control Information).

In an embodiment, the user equipment may obtain downlink control information by receiving a physical downlink control channel. The first indication information and the second indication information may be extracted from the downlink control information. The downlink control information includes the first indication information and the second indication information, and may further include time-frequency resource indication information for indicating which time-frequency resources in the target BWP of the target serving cell receive or send data.

Figure 4:
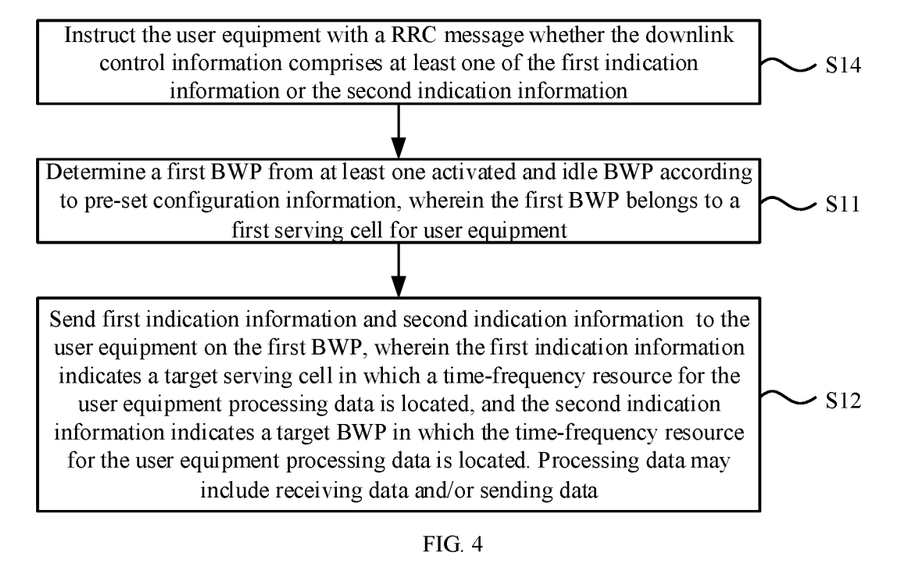
FIG. 4 is a schematic flowchart of yet another resource determining method according to an embodiment of the present disclosure.

FIG. 4 is a schematic flowchart of yet another resource determining method according to an embodiment of the present disclosure. As shown in FIG. 4, the method further includes the following step.

In step S14, before the first indication information and the second indication information is sent to the user equipment, the user equipment is instructed with a RRC message whether the downlink control information comprises at least one of the first indication information or the second indication information.

In an embodiment, the base station sends a RRC message, which indicates whether the downlink control information sent subsequently by the user equipment includes first indication information and/or second indication information, to the user equipment. The RRC message may indicate whether the downlink control information sent subsequently by the user equipment includes first indication information. The RRC message may indicate whether the downlink control information sent subsequently by the user equipment includes second indication information. The RRC message may indicate whether the downlink control information sent subsequently by the user equipment includes first indication information and second indication information. As such, when determining that the downlink control information sent subsequently includes the first indication information and the second indication information, the user equipment attempts to parse the first indication information and the second indication information from the downlink control information sent subsequently, avoiding that when the downlink control information sent subsequently includes the first indication information and the second indication information at different times, the user equipment attempts to parse the first indication information and the second indication information, resulting in a parsing error.

It is noted that, step S14 may be executed prior to step S11 as shown in FIG. 4, or the order of the execution may be adjusted according to demand, and it only needs to ensure the execution prior to step S12.

Figure 5:
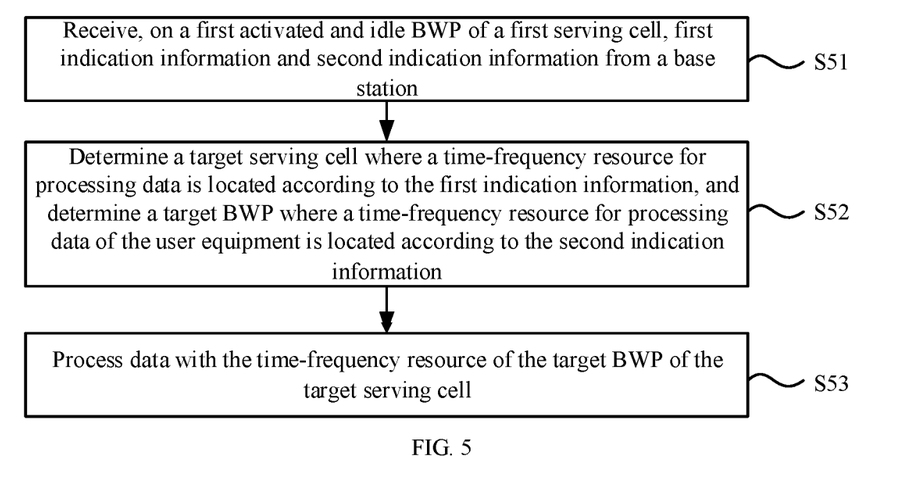
FIG. 5 is a schematic flowchart of yet another resource determining method according to an embodiment of the present disclosure.

FIG. 5 is a schematic flowchart of yet another resource determining method according to an embodiment of the present disclosure. The resource determining method shown in the embodiment may be applicable to user equipment. The user equipment may be an electronic device such as a mobile phone, a tablet computer and a wearable device. The user equipment may communicate with a base station, and the base station may be a 5G base station.

As shown in FIG. 5, the resource determining method may include the following steps.

In step S51, first indication information and second indication information from a base station is received on a first activated and idle BWP of a first serving cell.

In step S52, a target serving cell in which a time-frequency resource for processing data is located is determined according to the first indication information, and a target BWP in which a time-frequency resource for processing data of the user equipment is located is determined according to the second indication information.

In step S53, data is processed with the time-frequency resource of the target BWP of the target serving cell.

In an embodiment, the user equipment may have a plurality of serving cells, each serving cell corresponds to each carrier respectively, and each carrier may be divided into a plurality of BWPs. The base station configures one or more BWPs on the carrier of the serving cell for the user equipment while configuring each serving cell for the user equipment, and only one activated BWP may exist in the BWPs of the same serving cell, and the user equipment performs uplink signal transmission and downlink signal reception on the activated BWP.

In an embodiment, a user may receive the first indication information from the base station to determine a target serving cell in which a time-frequency resource for processing data is located, and further receive the second indication information from the base station to determine a target BWP in which the time-frequency resource for processing data is located. Thus, when the activated BWP in a certain serving cell (for example, the target serving cell) is not idle, the user equipment receive the first indication information and the second indication information from the base station on the activated and idle BWP of the first serving cell. The user equipment perform handover to an activated BWP in the target serving cell according to the first indication information and the second indication information (for example, handover to the target BWP indicated by the second indication information). Thus, the idle BWP may be handed over to the idle BWP and the idle BWP may be taken as the activated BWP. As a result, the user equipment may process the data in time on the time-frequency resource of the target BWP, thus the utilization ratio of the carrier of the target serving cell is improved, and the delay of service processing is reduced.

Optionally, the first indication information indicates the first serving cell, and the second indication information indicates the first BWP.

Optionally, the first indication information indicates the first serving cell, and the second indication information indicates a second BWP other than the first BWP, wherein the second BWP is an inactive but idle BWP of the first serving cell.

Figure 6:
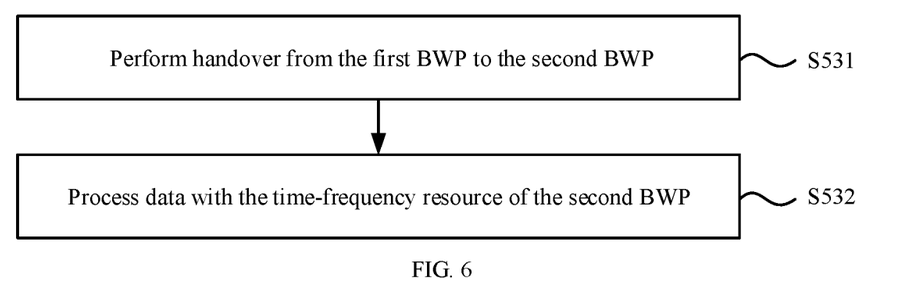
FIG. 6 is a schematic flowchart illustrating processing data on the target BWP of the target serving cell according to an embodiment of the present disclosure.

FIG. 6 is a schematic flowchart illustrating processing data on the target BWP of the target serving cell according to an embodiment of the present disclosure. As shown in FIG. 6, the processing data with the target BWP of the target serving cell includes the following steps.

In step S531, handover is performed from the first BWP to the second BWP;

In step S532, data is processed with a time-frequency resource in the second BWP.

In an embodiment, the user equipment performs a handover operation based on the target BWP determined by the second indication information, for example, the first indication information indicates a first serving cell, and the target BWP indicated by the second indication information is a second BWP, so that the currently activated BWP (i.e., the first BWP) of the first serving cell may be handed over to the second BWP, and then data may be processed through the time-frequency resources of the second BWP.

In an embodiment, a timer may be set for the duration of the user equipment kept in the second BWP. The duration of the user equipment kept in the second BWP is recorded by the timer, and if the duration of the user equipment processing data on the time-frequency resource of the second BWP reaches a first pre-set duration, the data may be handed over from the second BWP to the first BWP, and then processed on the time-frequency resource of the first BWP.

If processing data on the time-frequency resource of the second BWP, the user equipment receives the second indication information to indicate that the user equipment is handed over to the activated BWP of the first serving cell, and may also be handed over from the second BWP to another BWP.

Optionally, the first indication information indicates a second serving cell other than the first serving cell, and the second indication information indicates a third BWP which is an activated and idle BWP of the second serving cell.

Optionally, the first indication information indicates a second serving cell other than the first serving cell, and the second indication information indicates a fourth BWP which is an inactive but idle BWP of the second serving cell.

Figure 7:
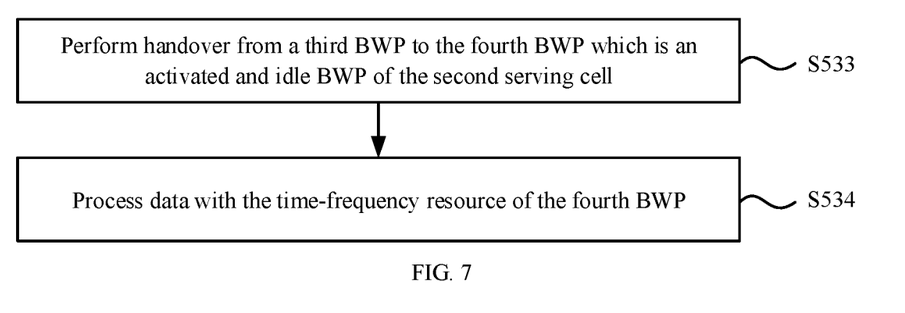
FIG. 7 is a schematic flowchart illustrating another processing data on the target BWP of the target serving cell according to an embodiment of the present disclosure.

FIG. 7 is a schematic flowchart illustrating another processing data on the target BWP of the target serving cell according to an embodiment of the present disclosure. As shown in FIG. 6, the processing data of the target BWP in the target serving cell includes the following steps.

In step S533, handover is performed from a third BWP to the fourth BWP which is an activated and idle BWP of the second serving cell;

In step S534, data is processed with the time-frequency resource of the fourth BWP.

In an embodiment, the user equipment performs a handover operation based on the target BWP determined by the second indication information, for example, the first indication information indicates the second serving cell, and the target BWP indicated by the second indication information is the fourth BWP, so that the currently activated BWP (i.e., the third BWP) of the second serving cell may be handed over to the fourth BWP, and then data may be processed through the time-frequency resources of the fourth BWP.

In an embodiment, a timer may be set for the duration of the user equipment kept in the fourth BWP. The duration of the user equipment kept in the second BWP is recorded by the timer, and if the duration of the user equipment processing data on the time-frequency resource of the fourth BWP reaches a second pre-set duration, the data may be handed over from the fourth BWP to the third BWP, and then processed on the time-frequency resource of the third BWP.

If the user equipment processes data on the time-frequency resource of the fourth BWP, the user equipment receives the second indication information to indicate that the user equipment is handed over the activated BWP of the second serving cell, and may also be handed over from the fourth BWP to another BWP.

Optionally, the first indication information and the second indication information are comprised in the downlink control information.

Figure 8:
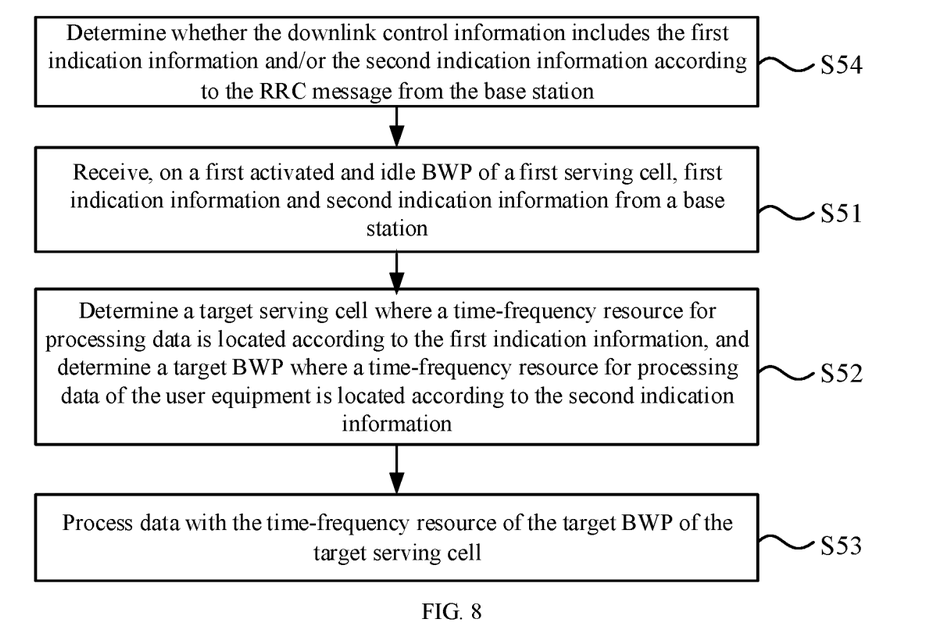
FIG. 8 is a schematic flowchart of yet another resource determining method according to an embodiment of the present disclosure.

FIG. 8 is a schematic flowchart of yet another resource determining method according to an embodiment of the present disclosure. As shown in FIG. 8, the method further includes the following step.

In step S54, prior to receiving the first indication information and the second indication information from the base station on the first activated and idle BWP of the first serving cell, it is determined whether the downlink control information includes the first indication information and/or the second indication information according to the RRC message from the base station.

If the downlink control information includes the first indication information and the second indication information, the first indication information and the second indication information from the base station are received on the first activated and idle BWP of the first serving cell.

Correspondingly to the foregoing embodiment of the resource determining method, the present disclosure further provides an embodiment of the resource determining apparatus.

Figure 9:
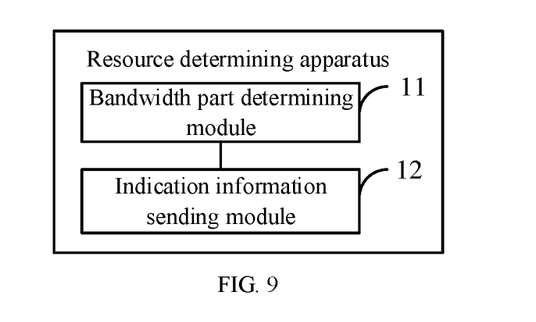
FIG. 9 is a schematic block diagram of a resource determining apparatus according to an embodiment of the present disclosure.

FIG. 9 is a schematic block diagram of a resource determining apparatus according to an embodiment of the present disclosure. The resource determining apparatus shown in the embodiment may be applicable to a base station, and the base station may be a 5G base station. The base station may communicate with user equipment, and the user equipment may be an electronic device such as a mobile phone, a tablet computer and a wearable device.

As shown in FIG. 9, the resource determining apparatus may include the following modules.

A bandwidth part determining module 11 is configured to determine a first bandwidth part (BWP) from at least one activated and idle BWP according to pre-set configuration information, wherein the first BWP belongs to a first serving cell for user equipment.

An indication information sending module 12 is configured to send first indication information and second indication information on the first BWP to the user equipment, wherein the first indication information indicates a target serving cell in which a time-frequency resource for the user equipment processing data is located, and the second indication information indicates a target BWP in which the time-frequency resource for the user equipment processing data is located.

Optionally, the first indication information indicates the first serving cell, and the second indication information indicates the first BWP.

Optionally, the first indication information indicates the first serving cell, and the second indication information indicates a second BWP other than the first BWP, wherein the second BWP is an inactive but idle BWP of the first serving cell.

Optionally, the first indication information indicates a second serving cell other than the first serving cell, and the second indication information indicates a third BWP which is an activated and idle BWP of the second serving cell.

Optionally, the first indication information indicates a second serving cell other than the first serving cell, and the second indication information indicates a fourth BWP which is an inactive but idle BWP of the second serving cell.

Figure 10:
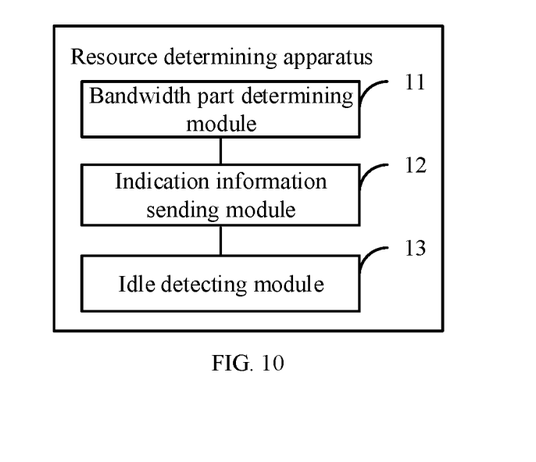
FIG. 10 is a schematic block diagram of another resource determining apparatus according to an embodiment of the present disclosure.

FIG. 10 is a schematic block diagram of another resource determining apparatus according to an embodiment of the present disclosure. As shown in FIG. 10, the apparatus further includes the following module.

An idle detecting module 13 is configured to detect whether an activated BWP of the second serving cell and an inactive BWP of the second serving cell are idle.

When the activated BWP of the second serving cell is not idle but the inactive BWP of the second serving cell is idle, the indication information sending module is configured to send the first indication information and the second indication information on the first BWP to the user equipment.

Optionally, a carrier for the first serving cell is a licensed carrier.

Optionally, a carrier for the first serving cell is an unlicensed carrier.

Optionally, the bandwidth part determining module is configured to monitor a channel corresponding to an activated BWP of at least one serving cell, to determine whether a BWP corresponding to an idle channel is activated and idle.

Optionally, the first indication information and the second indication information are comprised in downlink control information.

Figure 11:
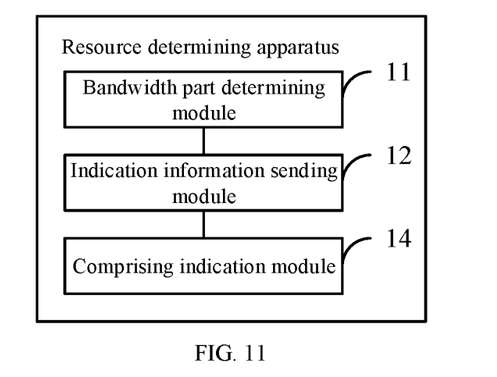
FIG. 11 is a schematic block diagram of yet another resource determining apparatus according to an embodiment of the present disclosure.

FIG. 11 is a schematic block diagram of yet another resource determining apparatus according to an embodiment of the present disclosure. As shown in FIG. 11, the apparatus further includes the following module.

A comprising indication module 14 is configured to instruct the user equipment with a Radio Resource Control (RRC) message whether the downlink control information includes at least one of the first indication information or the second indication information.

Figure 12:
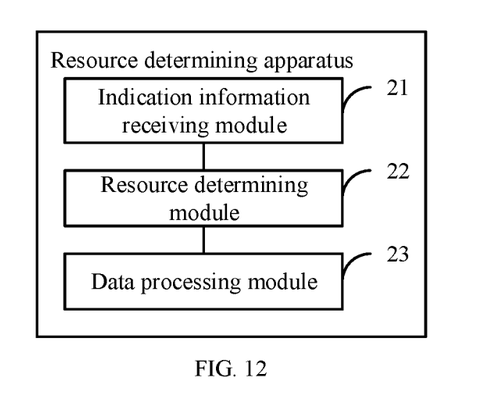
FIG. 12 is a schematic block diagram of yet another resource determining apparatus according to an embodiment of the present disclosure.

FIG. 12 is a schematic block diagram of yet another resource determining apparatus according to an embodiment of the present disclosure. The resource determining apparatus shown in this embodiment may be applicable to user equipment. The user equipment may be an electronic device such as a mobile phone, a tablet computer, and a wearable device. The user equipment may communicate with a base station, and the base station may be a 5G base station.

As shown in FIG. 12, the apparatus further includes the following modules.

An indication information receiving module 21 is configured to receive, on a first activated and idle BWP of a first serving cell, first indication information and second indication information from a base station.

A resource determining module 22 is configured to determine, according to the first indication information, a target serving cell in which a time-frequency resource for processing data is located, and determine, according to the second indication information, a target BWP in which the time-frequency resource for a user equipment processing data is located.

A data processing module 23 is configured to process data with the time-frequency resource in the target BWP of the target serving cell.

Optionally, the first indication information indicates the first serving cell, and the second indication information indicates the first BWP.

Optionally, the first indication information indicates the first serving cell, and the second indication information indicates a second BWP other than the first BWP, wherein the second BWP is an inactive but idle BWP of the first serving cell.

Figure 13:
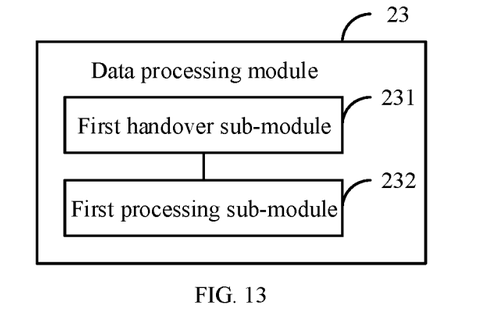
FIG. 13 is a schematic block diagram of a data processing module according to an embodiment of the present disclosure.

FIG. 13 is a schematic block diagram of a data processing module according to an embodiment of the present disclosure. As shown in FIG. 13, the data processing module 23 further includes the following sub-modules.

A first handover sub-module 231 is configured to performing handover from the first BWP to the second BWP.

A first processing sub-module 232 is configured to process data with a time-frequency resource in the second BWP.

Optionally, the first indication information indicates a second serving cell other than the first serving cell, and the second indication information indicates a third BWP which is an activated and idle BWP of the second serving cell.

Optionally, the first indication information indicates a second serving cell other than the first serving cell, and the second indication information indicates a fourth BWP which is an inactive but idle BWP of the second serving cell.

Figure 14:
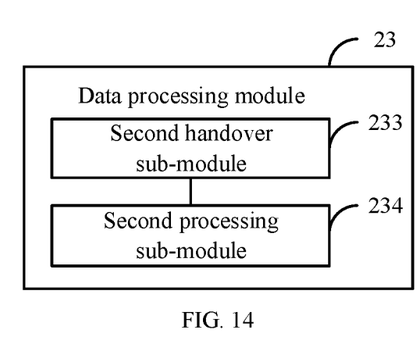
FIG. 14 is a schematic block diagram of another data processing module according to an embodiment of the present disclosure.

FIG. 14 is a schematic block diagram of another data processing module according to an embodiment of the present disclosure. As shown in FIG. 14, the data processing module 23 further includes the following sub-modules.

A second handover sub-module 233 is configured to perform handover from a third BWP to the fourth BWP which is an activated and idle BWP of the second serving cell A second processing sub-module 234 is configured to process data with the time-frequency resource of the fourth BWP.

Optionally, the first indication information and the second indication information are comprised in downlink control information.

Figure 15:
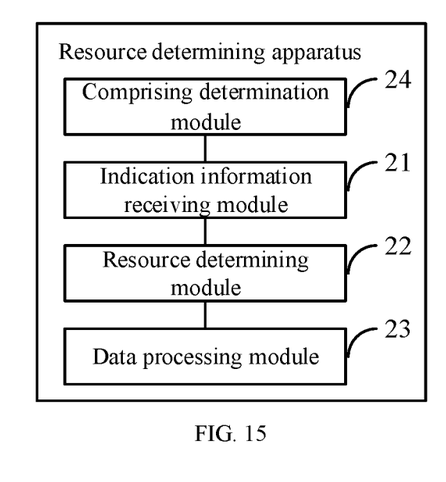
FIG. 15 is a schematic block diagram of yet another resource determining apparatus according to an embodiment of the present disclosure.

FIG. 15 is a schematic block diagram of yet another resource determining apparatus according to an embodiment of the present disclosure. As shown in FIG. 15, the apparatus further includes the following module.

A comprising determination module 24 is configured to determine, according to a RRC message from the base station, whether the downlink control information includes at least one of the first indication information or the second indication information.

When the downlink control information includes the first indication information and the second indication information, the indication information receiving module 21 is configured to receive, on the first activated and idle BWP of the first serving cell, the first indication information and the second indication information from the base station.

With respect to the apparatus in the foregoing embodiments, the specific manner in which each module performs operations has been described in detail in the embodiments of the related method, and will not be elaborated here.

Since the apparatus embodiments basically correspond to the method embodiments, the apparatus embodiments can refer to the part of the description of the method embodiments. The apparatus embodiments described above are merely illustrative. The units described as separate components may or may not be physically separated, and the components displayed as units may or may not be physical units, that is, they may be located in one place, or they may be distributed in multiple network units. Some or all of the modules may be selected according to actual requirements to achieve the objectives of the solutions of the embodiments. Those of ordinary skill in the art can understand and implement it without creative work.

An embodiment of the present disclosure also proposes an electronic device, including:

processor; and a memory for storing processor-executable instructions;

The processor is configured to implement the steps of the resource determining methods described in any of the foregoing embodiments.

The embodiment of the present disclosure also provides a computer-readable storage medium on which a computer program is stored. When the program is executed by a processor, the steps of the resource determining methods described in any of the foregoing embodiments are implemented.

Figure 16:
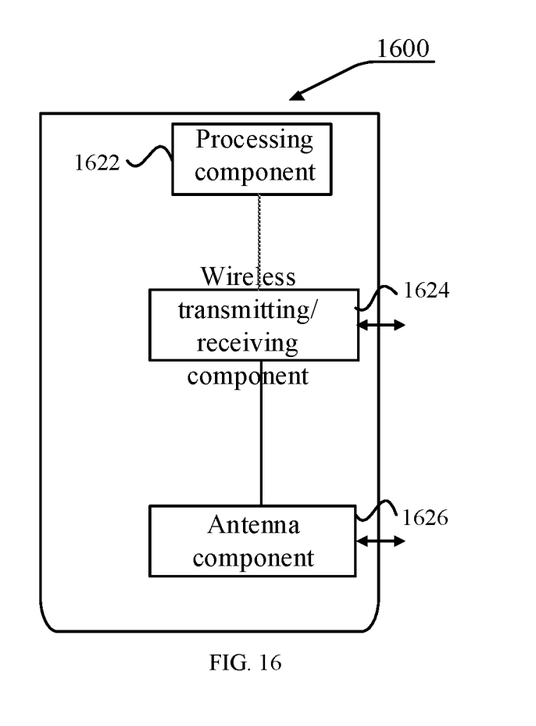
FIG. 16 is a structural schematic diagram of a resource determining apparatus according to an embodiment of the present disclosure.

As shown in FIG. 16, FIG. 16 is a schematic structural diagram of a resource determining apparatus 1600 according to an embodiment of the present disclosure. The apparatus 1600 may be provided as a base station. In FIG. 16, the device 1600 includes a processing component 1622, a wireless transmitting/receiving component 1624, an antenna component 1626, and a signal processing part specific to a wireless interface. The processing component 1622 may further include one or more processors. One of the processors in the processing component 1622 may be configured to implement the steps in the embodiments described in FIGS. 5 to 8 above.

Figure 17:
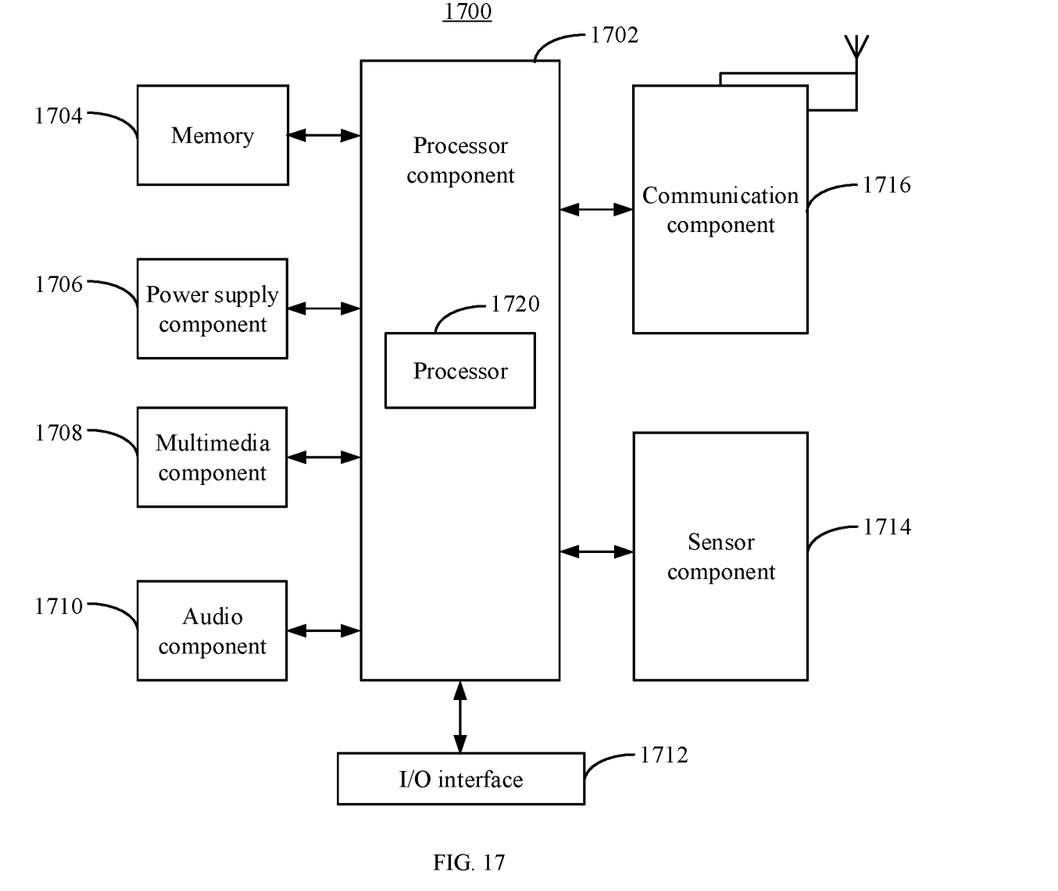
FIG. 17 is another schematic structural diagram of a resource determining apparatus according to an embodiment of the present disclosure.

FIG. 17 is another schematic structural diagram of a resource determining apparatus according to an embodiment of the present disclosure. For example, the apparatus 1700 may be mobile phones, computers, digital broadcasted terminals, message transceivers, game consoles, tablet devices, medical devices, fitness devices and personal digital assistants.

Referring to FIG. 17, the apparatus 1700 may include one or more of the following components: a processing component 1702, a memory 1704, a power supply component 1706, a multimedia component 1708, an audio component 1710, an input/output (I/O) interface 1712, a sensor component 1714, and a communication component 1716.

The processing component 1702 generally controls overall operations of the apparatus 1700, such as operations associated with display, phone calls, data communications, camera operations, and recording operations. The processing component 1702 may include one or more processors 1720 to execute instructions to implement all or part of the steps of the above method embodiments implemented by UE 20. In addition, the processing component 1702 may include one or more modules which facilitate the interaction between the processing component 1702 and other components. For example, the processing component 1702 may include a multimedia module to facilitate the interaction between the multimedia component 1708 and the processing component 1702.

The memory 1704 is configured to store various types of data to support the operation of the apparatus 1700. Examples of such data include instructions for any application or method operated on the apparatus 1700, contact data, phonebook data, messages, pictures, videos, and so on. The memory 1704 may be implemented by any type of volatile or non-volatile storage devices or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 1706 provides power to different components of the apparatus 1700. The power supply component 1706 may include a power management system, one or more power supplies, and other components associated with generating, managing, and distributing power for the apparatus 1700.

The multimedia component 1708 includes a screen providing an output interface between the apparatus 1700 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1708 may include a front camera and/or a rear camera. The front camera and/or rear camera may receive external multimedia data when the apparatus 1700 is in an operating mode, such as a photographing mode or a video mode. Each of the front camera and the rear camera may be a fixed optical lens system or have focal length and optical zooming capability.

The audio component 1710 is configured to output and/or input an audio signal. For example, the audio component 1710 includes a microphone (MIC). When the apparatus 1700 is in an operating mode, such as a call mode, a recording mode, and a voice recognition mode, the MIC is configured to receive an external audio signal. The received audio signal may be further stored in the memory 1704 or sent via the communication component 1716. In some examples, the audio component 1710 further includes a speaker to output an audio signal.

The I/O interface 1712 may provide an interface between the processing component 1702 and peripheral interface modules. The above peripheral interface modules may include a keyboard, a click wheel, buttons and so on. These buttons may include, but are not limited to, a home button, a volume button, a starting button and a locking button.

The sensor component 1714 includes one or more sensors to provide status assessments of various aspects for the apparatus 1700. For example, the sensor component 1714 may detect the on/off status of the apparatus 1700, and relative positioning of component, for example, the component is a display and a keypad of the apparatus 1700. The sensor component 1714 may also detect a change in position of the apparatus 1700 or a component of the apparatus 1700, a presence or absence of the contact between a user and the apparatus 1700, an orientation or an acceleration/deceleration of the apparatus 1700, and a change in temperature of the apparatus 1700. The sensor component 1714 may include a proximity sensor to detect the presence of a nearby object without any physical contact. The sensor component 1714 may further include an optical sensor, such as a Complementary.

Metal-Oxide-Semiconductor (CMOS) or Charged Coupled Device (CCD) image sensor which is used in imaging applications. In some examples, the sensor component 1714 may further include an acceleration sensor, a gyroscope sensor, a magnetic sensor, a pressure sensor, or a temperature sensor.

The communication component 1716 is configured to facilitate wired or wireless communication between the apparatus 1700 and other devices. The apparatus 1700 may access a wireless network that is based on a communication standard, such as Wi-Fi, 2G or 3G, or a combination thereof. In an example, the communication component 1716 receives a broadcasted signal or broadcast-associated information from an external broadcasted management system via a broadcasted channel. In an example, the communication component 1716 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth® (BT) technology and other technologies.

In an example, the apparatus 1700 may be implemented by one or more Application Specific Integrated Circuits (ASIC), Digital Signal Processors (DSP), Digital Signal Processing Devices (DSPD), programmable Logic Devices (PLD), Field Programmable Gate Arrays (FPGA), controllers, microcontrollers, microprocessors, or other electronic components for performing the above methods according to the embodiments of FIGS. 1-4.

In an example, there is also provided a non-transitory machine-readable storage medium including instructions, such as a memory 1704 including instructions. The above instructions may be executed by the processor 1720 of the apparatus 1700 to perform the above methods. For example, the non-transitory machine-readable storage media may include a Read-Only Memory (ROM), a Random-Access Memory (RAM), a Compact disc ROM (CD-ROM), a magnetic tape, a floppy disk, an optical data storage device and so on.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, such that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The method and apparatus provided by the embodiments of the present invention are described in detail above. Specific examples are used herein to set forth the principle and implementation of the present invention. The description of the above embodiments is merely used to help understand the method and core idea of the present invention. Meanwhile, for a person of ordinary skill in the art, according to the idea of the present invention, there will be a change in the specific implementation and application range, and in summary, the contents of the present description should not be construed as limiting the present invention.

What is claimed is:

1. A resource determining method, comprising:
when an activated bandwidth part (BWP) in a target serving cell for a user equipment is not idle or a bandwidth of the BWP cannot satisfy a bandwidth required for the user equipment to process data on the target serving cell, determining a first BWP from at least one activated and idle BWP according to pre-set configuration information, wherein the first BWP belongs to a first serving cell for the user equipment, and a carrier corresponding to the target serving cell belongs to an unlicensed spectrum; and
sending, on the first BWP, first indication information and second indication information to the user equipment, wherein the first indication information indicates a target serving cell in which a time-frequency resource for the user equipment processing data is located, and wherein the second indication information indicates an activated and idle target BWP in which the time-frequency resource for the user equipment processing data is located.

2. The method according to claim 1, wherein
the first indication information indicates the first serving cell, and
the second indication information indicates the first BWP.

3. The method according to claim 1, wherein
the first indication information indicates the first serving cell, and
the second indication information indicates a second BWP other than the first BWP, wherein the second BWP is an inactive but idle BWP of the first serving cell.

4. The method according to claim 1, wherein
the first indication information indicates a second serving cell other than the first serving cell, and
the second indication information indicates a third BWP which is an activated and idle BWP of the second serving cell.

5. The method according to claim 1, wherein
the first indication information indicates a second serving cell other than the first serving cell, and
the second indication information indicates a fourth BWP which is an inactive but idle BWP of the second serving cell.

6. The method according to claim 5, further comprising:
prior to sending the first indication information and the second indication information on the first BWP to the user equipment, detecting whether an activated BWP of the second serving cell and an inactive BWP of the second serving cell are idle;
when the activated BWP of the second serving cell is not idle but the inactive BWP of the second serving cell is idle, sending the first indication information and the second indication information on the first BWP to the user equipment.

7. The method according to claim 1, wherein a carrier for the first serving cell is a licensed carrier.

8. The method according to claim 1, wherein a carrier for the first serving cell is an unlicensed carrier.

9. The method according to claim 8, wherein determining the first BWP from at least one activated and idle BWP according to the pre-set configuration information comprises:
monitoring a channel corresponding to an activated BWP of at least one serving cell, to determine whether a BWP corresponding to an idle channel is activated and idle.

10. The method according to claim 1, wherein the first indication information and the second indication information are comprised in downlink control information.

11. The method according to claim 10, further comprising:
prior to sending the first indication information and the second indication information to the user equipment, instructing the user equipment with a Radio Resource Control (RRC) message whether the downlink control information comprises at least one of the first indication information or the second indication information.

12. A resource determining method, comprising:
when an activated bandwidth part (BWP) in a target serving cell for a user equipment is not idle or a bandwidth of the BWP cannot satisfy a bandwidth required for the user equipment to process data on the target serving cell, receiving, on a first activated and idle BWP of a first serving cell, first indication information and second indication information from a base station, wherein a carrier corresponding to the target serving cell belongs to an unlicensed spectrum;
determining, according to the first indication information, a target serving cell in which a time-frequency resource for processing data is located;
determining, according to the second indication information, an activated and idle target BWP in which the time-frequency resource for the user equipment processing data is located; and
processing data with the time-frequency resource in the target BWP of the target serving cell.

13. The method according to claim 12, wherein
the first indication information indicates the first serving cell, and
the second indication information indicates the first BWP.

14. The method according to claim 12, wherein
the first indication information indicates the first serving cell, and
the second indication information indicates a second BWP other than the first BWP, wherein the second BWP is an inactive but idle BWP of the first serving cell.

15. The method according to claim 14, wherein processing data with the target BWP of the target serving cell comprises:
performing handover from the first BWP to the second BWP;
processing data with a time-frequency resource in the second BWP.

16. The method according to claim 12, wherein
the first indication information indicates a second serving cell other than the first serving cell, and
the second indication information indicates a third BWP which is an activated and idle BWP of the second serving cell.

17. The method according to claim 12, wherein
the first indication information indicates a second serving cell other than the first serving cell, and
the second indication information indicates a fourth BWP which is an inactive but idle BWP of the second serving cell.

18. The method according to claim 17, wherein processing data with the target BWP in the target serving cell comprises:
performing handover from a third BWP to the fourth BWP which is an activated and idle BWP of the second serving cell;
processing data with a time-frequency resource in the fourth BWP.

19. The method according to claim 12, wherein the first indication information and the second indication information are comprised in downlink control information.

20. An electronic device, comprising:
a processor;
a memory for storing processor-executable instructions;
wherein the processor is configured to implement the resource determining method according to claim 1.

* * * * *